(12) United States Patent
Hoffman

(10) Patent No.: US 6,927,379 B2
(45) Date of Patent: Aug. 9, 2005

(54) HERMETICALLY SEALED DIGITAL DETECTOR

(75) Inventor: David M. Hoffman, New Berlin, WI (US)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 1026 days.

(21) Appl. No.: 09/747,549

(22) Filed: Dec. 22, 2000

(65) Prior Publication Data

US 2002/0080265 A1 Jun. 27, 2002

(51) Int. Cl.⁷ .............................................. H01L 27/00
(52) U.S. Cl. .................................... 250/208.1; 250/239
(58) Field of Search .............................. 250/208.1, 239, 250/214.1, 370.11, 370.01; 257/80, 81, 82, 83, 84, 432, 434

(56) References Cited

U.S. PATENT DOCUMENTS

| 4,491,865 A | * | 1/1985 | Danna et al. ................. 348/71 |
| 6,770,885 B2 | * | 8/2004 | Eberhard et al. ...... 250/370.11 |

* cited by examiner

Primary Examiner—Que T. Le
(74) Attorney, Agent, or Firm—Fletcher Yoder

(57) ABSTRACT

A technique is provided for improving the efficiency of an imaging system. Generally, a digital detector has an array of rows and columns of pixels, read out electronics and scan electronics that are configured to generate and transmit signals based upon radiation impacting the detector. The detector is placed within a housing, which is then transferred to the location of use. The present technique provides a mechanism for protecting the housing and the detector from corruptive elements such as moisture. Particularly, the present technique involves the sealing of the detector after manufacture and sealing of the housing after assembly.

22 Claims, 5 Drawing Sheets

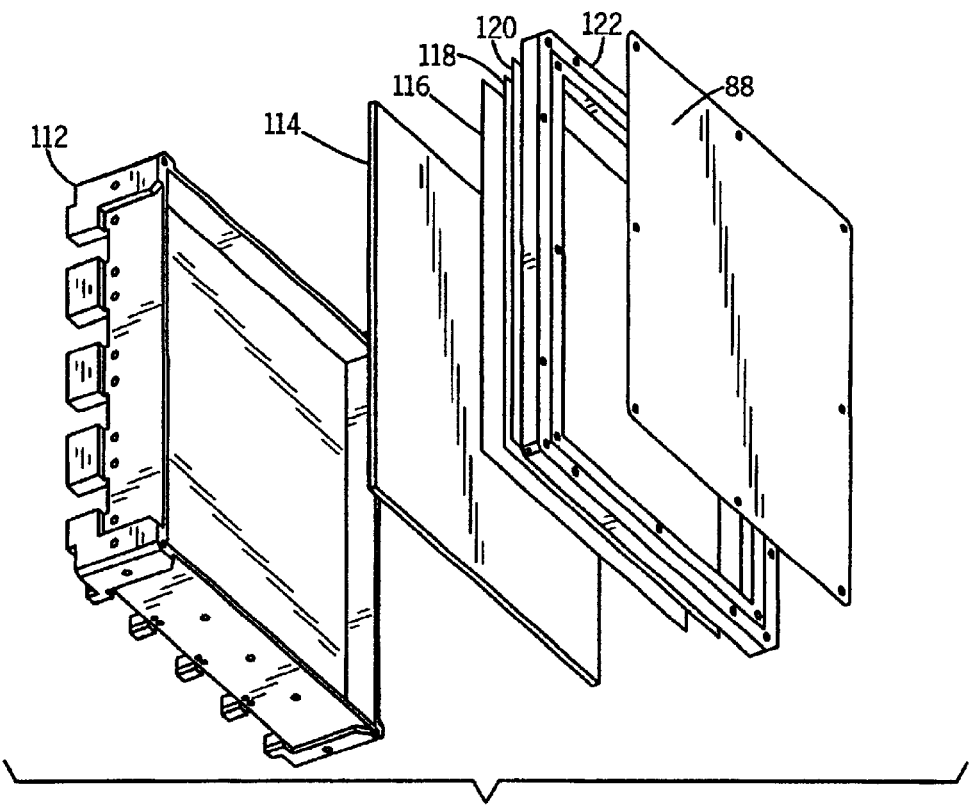
FIG. 6
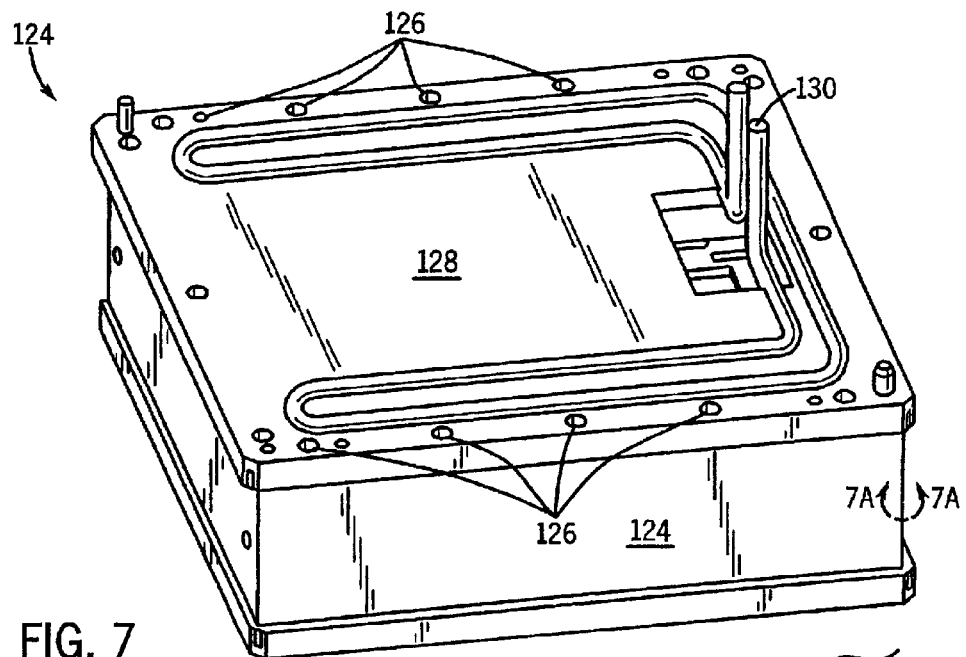
FIG. 7
FIG. 7A

HERMETICALLY SEALED DIGITAL DETECTOR

FIELD OF THE INVENTION

The present invention relates generally to digital detectors for imaging systems, such as digital x-ray systems. Particularly, the present invention relates to sealing of a digital detector to protect the detector components and circuitry during manufacturing, installation and use.

BACKGROUND OF THE INVENTION

Digital x-ray imaging systems are becoming increasingly widespread for producing digital data, which can be reconstructed into useful radiographic images. In current digital x-ray imaging systems, radiation from a source is directed toward a subject, typically a patient in a medical diagnostic application. A portion of the radiation passes through the patient and impacts a detector. The surface of the detector converts the radiation to light photons, which are sensed. The detector is divided into a matrix of discrete picture elements or pixels, and encodes output signals based upon the quantity or intensity of the radiation impacting each pixel region. Because the radiation intensity is altered as the radiation passes through the patient, the images reconstructed based upon the output signals, provide a projection of the patient's tissues similar to those available through conventional photographic film techniques.

In one currently available system, the surface of the digital detector is divided into a matrix of picture elements or pixels, with rows and columns of pixels being organized adjacent to one another to form the overall image area. When the detector is exposed to radiation, photons impact an aluminum/graphite cover coextensive with the image area. The image area is usually coated with a material to prevent the corruption of the detector and moreover to create better quality images. A series of detector elements are formed at row and column crossing points, each crossing point corresponding to a pixel making up the image matrix. In one type of detector, each element consists of a photodiode and a thin film transistor. The photodiode is the photosensitive element that absorbs light from the scintillator and discharges the capacitor. The cathode of the diode is connected to the source of the transistor, and the anodes of all diodes are connected to a negative bias voltage. The gates of the transistors in a row are connected together and the row electrode is connected to scanning electronics. The drains of the transistors in each column are connected together and each column electrode is connected to additional readout electronics. Sequential scanning of the rows and columns permits the system to acquire the entire array or matrix of signals for subsequent signal processing and display.

In use, the signals generated at the pixel locations of the detector are sampled and digitized. The digital values are transmitted to processing circuitry where they are filtered, scaled and further processed to produce the image data set. The data set may then be used to store the resulting image, to display the image, such as on a computer monitor, to transfer the image to conventional photographic film, and so forth. In the medical imaging field, such images are used by attending physicians and radiologists in evaluating the physical conditions of a patient and diagnosing disease and trauma.

Digital x-ray imaging systems are particularly useful due to their ability to collect digital data, which can be reconstructed into the images required by radiologists and diagnosing physicians, and stored digitally or archived until needed. In conventional film-based radiography techniques, actual films are prepared, exposed, developed and stored for use by the radiologist. While the films provide an excellent diagnostic tool, particularly due to their ability to capture significant anatomical detail, they are inherently difficult to transmit between locations, such as from an imaging facility or department to various physician locations. By contrast, the digital data produced by direct digital x-ray systems may be processed and enhanced, stored, transmitted via networks, and used to reconstruct images which can be displayed on monitors and other soft copy displays at any desired location. Similar advantages are offered by digitizing systems, which convert conventional radiographic images from film to digital data.

In digital detectors of the type described above, problems may arise due to corruption of the panel, and more specifically, of the individual components within the detector. For example, moisture may have a corruptive effect upon the components. The amorphous silicon and cesium iodide scintillators are particularly moisture sensitive, and with entry of moisture into the system, system degradation may occur. Proposed solutions to protect such sensitive components include individually coating these materials. However, this process only protects the individual components and only during the manufacturing process. For instance, during shipping the system may be contaminated by moisture. Furthermore, individually coating the components of the system may adversely affect the compatibility of the components with each other.

Another approach to this problem may be to manufacture the detector and system in a clean environment. Although a clean environment provides some protection during manufacturing, such protection is not provided after the manufacturing process. For instance, the housing incorporating the panel and components is not sealed during the process. Therefore, after completion the housing may not adequately protect the internal components of the detector against moisture and other potential contaminants.

There remains a need, therefore, for an efficient and dependable technique designed to seal a digital detector. There is a particular need for a technique which can be implemented to the housing of a digital detector, such that corruption by external contaminants is reduced or prevented, thereby to avoid degradation of a digital x-ray imaging system.

SUMMARY OF THE INVENTION

The present technique may address one or more of the problems set forth above.

The present technique provides a digital detector which protects the detector panel from corruption from external elements. The present technique involves the sealing of the detector. In one embodiment, the panel assembly may be sealed with a coating protecting the detector panel from degradation due to moisture and other elements. In another embodiment, the detector housing may also be hermetically sealed providing additional protection from such elements. Further, the external conductors may be masked so that the sealing process does not damage or coat the conductor lines. In another embodiment, individual components of the detector may be sealed to further increase efficiency for the detector. For instance, the detector window may be sealed with a sealing material, such as parylene. In a further embodiment the outer cover and mounting base of the detector may be sealed via a similar coating, further protecting the digital detector components.

BRIEF DESCRIPTION OF THE DRAWINGS

The foregoing and other advantages of the invention will become apparent upon reading the following detailed description and upon reference to the drawings in which:

FIG. 6 illustrates the components comprising the assembly of an exemplary digital detector;

FIG. 7 illustrates an outer housing having a protective coating for use in an exemplary digital detector;

FIG. 7a illustrates a detailed cross-section of an edge of the outer housing depicted in FIG. 7.

DETAILED DESCRIPTION OF THE INVENTION

Figure 1:
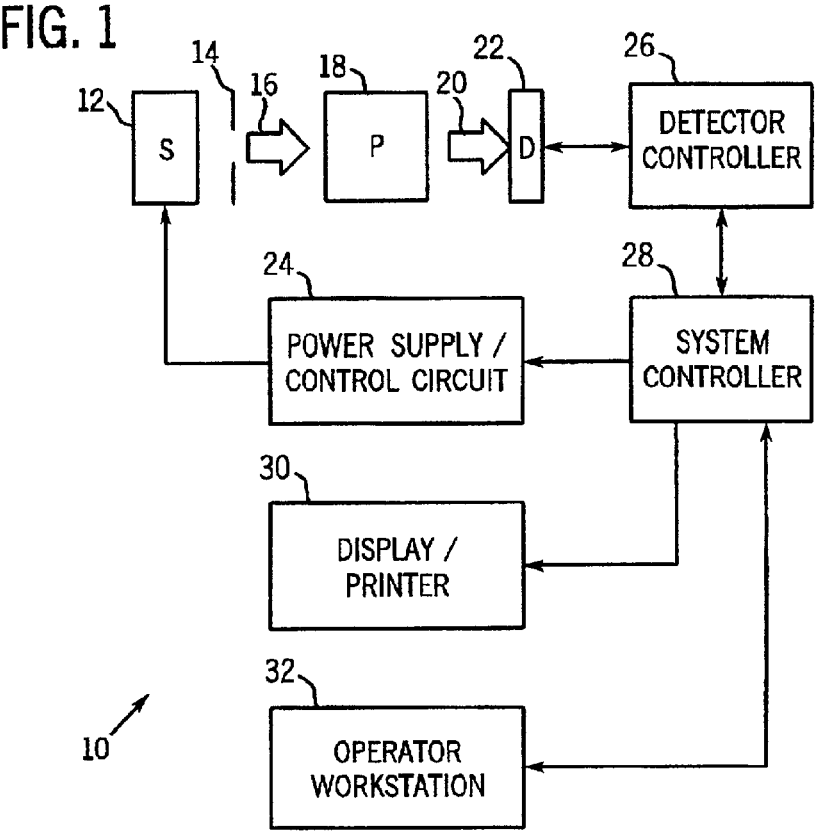
FIG. 1 is a diagrammatical overview of a digital x-ray imaging system in which the present technique is incorporated.

FIG. 1 illustrates diagrammatically an imaging system 10 for acquiring and processing discrete pixel image data. In the illustrated embodiment, system 10 is a digital x-ray system designed both to acquire original image data, and to process the image data for display in accordance with the present technique. In the embodiment illustrated in FIG. 1, imaging system 10 includes a source of x-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital x-ray detector, represented generally at reference numeral 22. As described more fully below, detector 22 converts the x-ray photons received on its surface to lower energy photons, and subsequently to electric signals, which are acquired and processed to reconstruct an image of the features within the subject.

Source 12 is controlled by a power supply/control circuit 24, which furnishes both power and control signals for examination sequences. Moreover, detector 22 is coupled to a detector controller 26 which commands acquisition of the signals generated in the detector. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
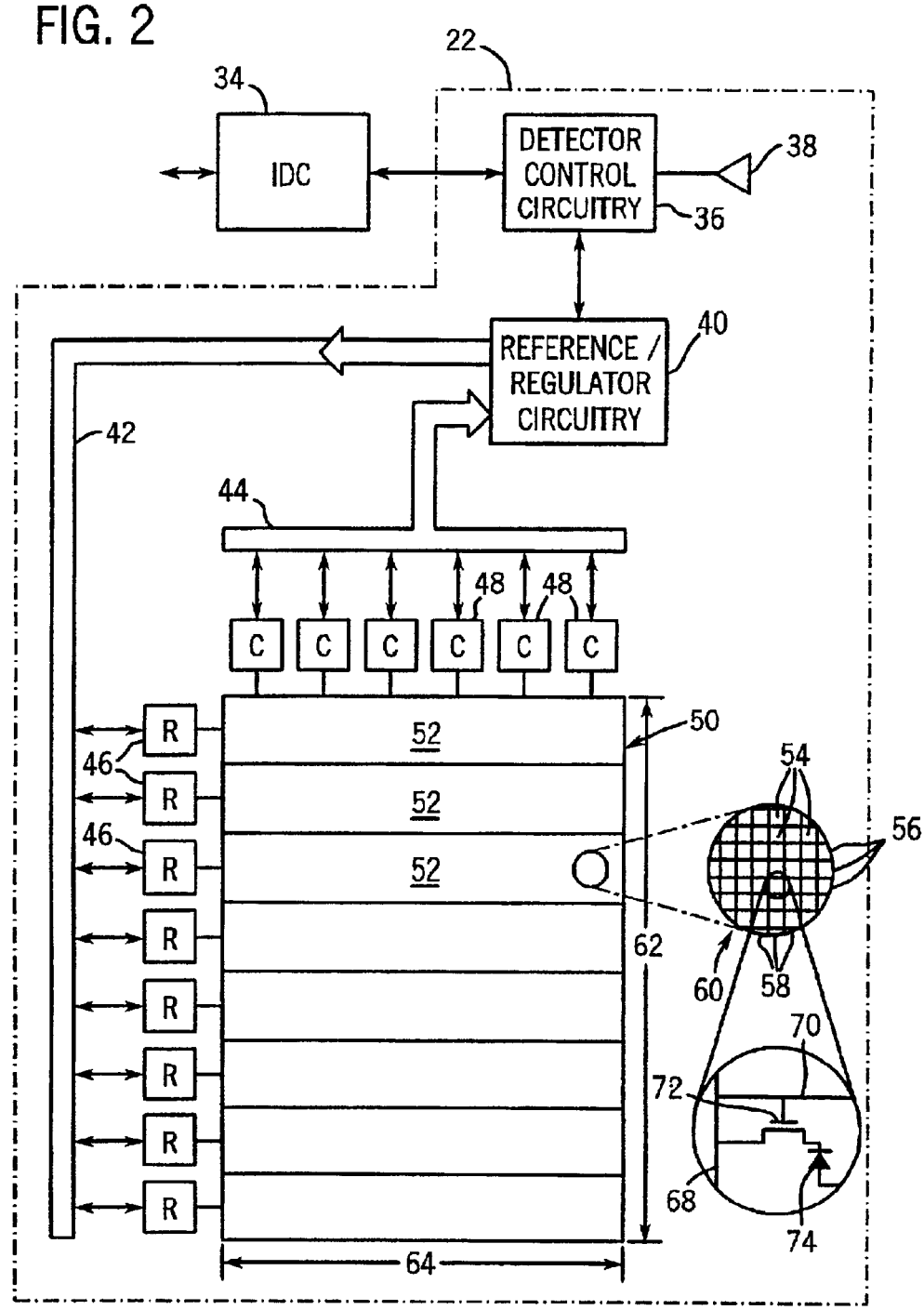
FIG. 2 is a diagrammatical representation of the functional circuitry for producing image data in a detector of the system of FIG. 1 to produce image data for reconstruction.

FIG. 2 is a diagrammatical representation of functional components of digital detector 22. FIG. 2 also represents an imaging detector controller or IDC 34, which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column drivers used to transmit signals during data acquisition phases of operation of the system. Circuitry 36 therefore transmits power and control signals to reference/regulator circuitry 40, and receives digital image pixel data from circuitry 40.

In a presently preferred embodiment, illustrated detector 22 consists of a scintillator that converts x-ray photons received on the detector surface during examinations to lower energy (light) photons. The surface of the detector, which receives the incident x-ray photons, is generally an aluminum/graphite cover. A thin radiographic film then absorbs the photons. Next, an array of photodetectors converts the light photons to electrical signals which are representative of the number of photons or the intensity of radiation impacting individual pixel regions of the detector surface. Readout electronics convert the resulting analog signals to digital values that can be processed, stored, and displayed, such as in a display 30 or a workstation 32 following reconstruction of the image. In a present form, the array of photodetectors is formed on a single base of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics. The drains of the transistors in a column are connected together and an electrode of each column is connected to readout electronics.

In the particular embodiment illustrated in FIG. 2, by way of example, a row bus 42 includes a plurality of conductors for enabling readout from various columns of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode may be accessed via readout electronics 48, and converted to digital signals for subsequent processing and image reconstruction.

Figure 3:
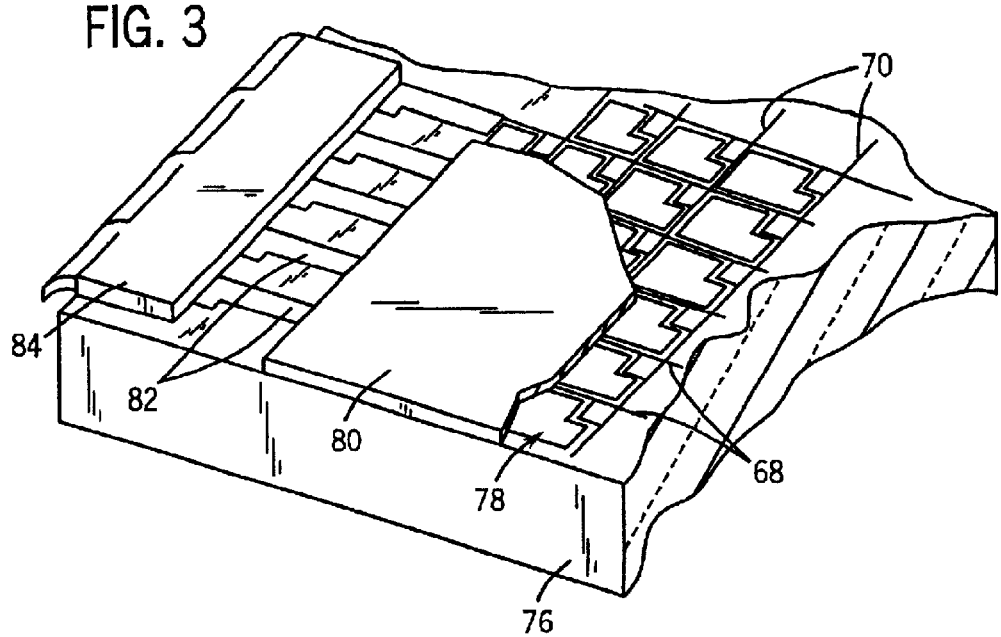
FIG. 3 is a partial sectional view illustrating an exemplary detector structure for producing the image data.

FIG. 3 generally represents an exemplary physical arrangement of the components illustrated diagrammatically in FIG. 2. As shown in FIG. 3, the detector may include a glass substrate 76 on which the components described below are disposed. Column electrodes 68 and row electrodes 70 are provided on the glass substrate 76, and an amorphous silicon flat panel array 78 is defined, including the thin film transistors and photodiodes described above. A scintillator 80 is provided over the amorphous silicon array 78 for receiving radiation during examination sequences as described above. Contact fingers 82 are formed for communicating signals to and from the column and row electrodes, and contact leads 84 are provided for communicating the signals between the contact fingers 82 and external circuitry. It should be noted that a housing (not shown) is assembled onto the detector. Thus, contact fingers 82 and contact leads 84 are generally protected against moisture and other forms of corruptive agents in the present embodiment.

Figure 4:
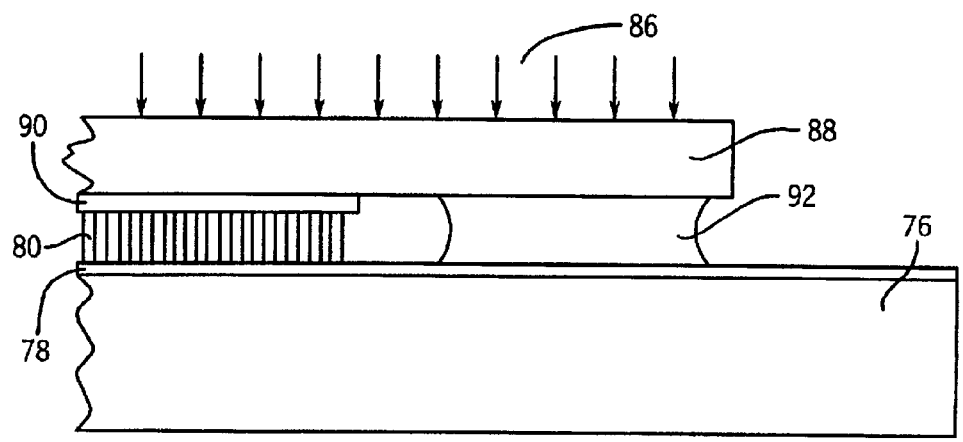
FIG. 4 illustrates a cross sectional view of a portion of an exemplary detector.

FIG. 4 illustrates a cross sectional view of a portion of an exemplary detector. As mentioned earlier, the detector 22 generally receives x-ray photons 86 from a source 12, which bombard an aluminum/graphite cover 88. The aluminum/graphite cover 88 is adapted to receive the x-ray photons, which are absorbed by an opticlad layer 90. It should be noted that the aluminum/graphite cover 88 may be sealed to allow for protection from corruptive elements such as moisture. However, the sealant on the cover 88 may be removed when the detection is placed in service. A protective layer on the cover 88 is particularly effective during the shipping and manufacturing processes.

Opticlad layer 90 may typically be a metal polymer composite x-ray reflective film. Opticlad layer 90 allows for the incoming photons to be absorbed by the scintillator 80. Thus, opticlad layer 90 is coupled to the scintillator 80, thereby facilitating the absorption of the incoming incident x-rays photons 86. As mentioned above, scintillator 80 converts the incident x-ray photons 86 received on the aluminum/graphite cover 88 during examinations to lower energy (light) photons. The scintillator 80 is also coupled to the amorphous silicon array 78. The amorphous silicon array 78 of photodetectors converts the incident light photons to electrical signals which are representative of the number of photons or the intensity of radiation impacting individual pixel regions of the detector surface. The array 78 is also coupled to the glass substrate 76, as mentioned above. The structure of each pixel of the amorphous silicon array 78 will be discussed more fully below.

It should be noted that the aluminum/graphite cover 88 is also joined to the glass substrate 78 by an epoxy seal 92. The purpose of the epoxy seal 92 is to provide a durable connection between the cover and the glass substrate. The seal also provides optimal efficiency for light absorption between the aluminum/graphite cover 88 and the array 78. Further, the epoxy seal 92 provides limited protection against corruptive elements which might affect the scintillator 80. In one embodiment, a sealant may be utilized to seal the elements of the detector, thus protecting these individual elements. However, it should be understood that individually coating specific elements, for example the scintillator, could cause incompatibility between the components. Therefore, it is more desirable to seal the assembled detector structure rather than the individual components.

Figure 5:
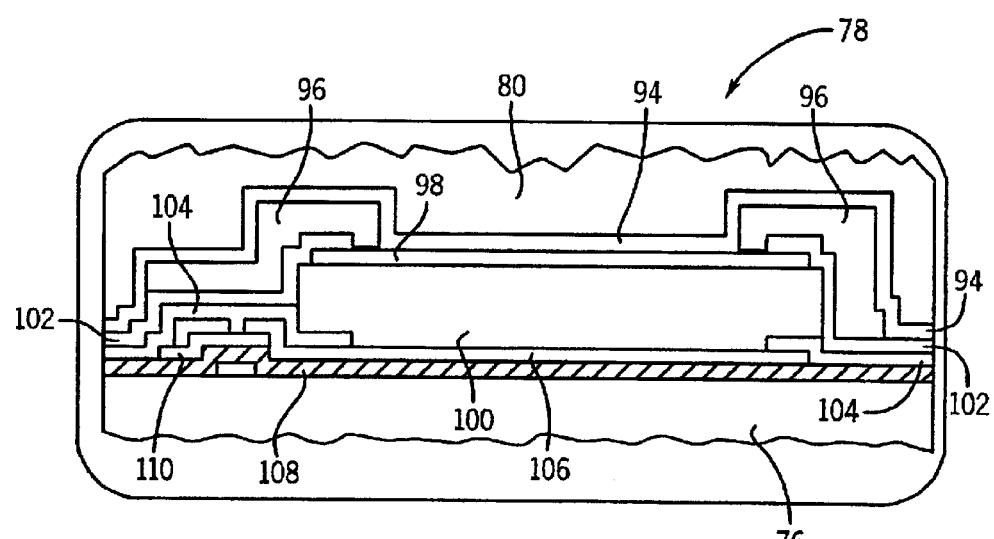
FIG. 5 is a schematic illustration of the structure of each pixel of the amorphous silicon photosensitive array in an exemplary digital detector.

Turning to FIG. 5, a more detailed schematic illustration of the structure of each pixel of the amorphous silicon photosensitive array 78 is shown. Generally, within a digital detector the photodiode is the photosensitive element that absorbs light from the scintillator 80 and discharges the capacitor (not shown). Further, a field effect transistor is used as a switch to control when the charge on the capacitor is restored by the external electronics. It should be noted that the individual pixels are replicated horizontally and vertically so as to form the array 78.

Scintillator 80 is shown configured to the array 78, specifically a single pixel in FIG. 5. The scintillator 80 is shown as a first layer over an ITO common line 94 configured to couple with the anode of the diode. Two polymide layers 96 are also depicted below the scintillator layer and the ITO common line 94. Additionally, an ITO strap layer 98 is shown disposed between the ITO common line 94 layer and a diode island 100. Further, diode passivation lines 102 are shown on either side of the diode island 100 beginning at a location below the polymide layer 96 and ending at an outer position. Also, a diode cut line 104, similar to the diode passivation lines 102, is illustrated. A field effect transistor 110 is depicted in a position below the diode passivation line 102 and diode cut line 104. A metal layer 106 is placed below the diode island 100 and a read out line 108. The read out line 108 extends from a first end of the individual pixel to a second end. Finally, the glass substrate 76 is shown positioned below the read out line. The entire structure may be sealed, as mentioned above, using a hermetic seal, thus providing protection against elements that may corrupt the pixel circuitry and reduce the quality of the image data. It should be noted that not only may the panel assembly be sealed, but also the detector housing as described in more detail below.

FIG. 6 illustrates the components of the detector housing. Particularly, FIG. 6 illustrates the positioning of the components of the housing within the detector assembly. A body 112 is illustrated having a recess with peripheral walls. The body 112 also has a base being adaptable to a mounting base (not shown) to form a unified structure. The body also has fasteners so that the assembly may be joined with an external cover (not shown). Further, the recess of the body 112 is configured to contain a plurality of components including a lead sheet 114. The lead sheet 114 is placed within the recess of the body 112 forming a foundation for the other components of the assembly. Next, a tin sheet 116 may be deposited within the recess of the body 112 positioned above the lead sheet 114. A vinyl film 118 may then be deposited within the recess of the body 112 above the tin sheet 116. The panel assembly 120, comprising the scintillator 80, the amorphous silicon array 78 and the glass substrate 76 described above may be placed over a vinyl film 118 into the recess of the body 112. A bezel layer 122 is then adapted to fit in position above the panel assembly 120. Finally, the aluminum/graphite cover 88 is placed above the bezel layer 122. As noted above, the aluminum/graphite cover 88 receives x-ray photons 86. Therefore, the cover is placed in a position designed to receive such photons from the source 12, and with the panel assembly located between the cover and the underlying sheets.

It should be mentioned that the placement of the components of the detector assembly in this particular embodiment might be modified for various reasons. Additionally, the type of fasteners and size of the recess, as well as the dimensions of the body 112 and the individual components of the assembly are not critical to the assembly described in this particular embodiment. Moreover, it should be noted that the detector assembly might be sealed, such as by a parylene coating, prior to assembly within the housing. For example, such coating of the detector assembly may seal against moisture. It should also be noted that conductors that are routed to the edges of the array and adapted to connect outside the detector assembly may be masked. The masking of the conductors protects the conductors from being sealed during the coating process either of the panel assembly or of the housing.

FIG. 7 illustrates a housing having an outer cover and housing in which the detector assembly is placed. A mounting base presents a recess with peripheral walls is illustrated by reference numeral 124. Typically, the detector assembly as in FIG. 6 may be placed within the mounting base 124 wherein the body 112 of the detector assembly is placed within the recess first. The mounting base 124 may have pinholes 126 to allow for the fastening of the detector assembly with the mounting base 124. Particularly, the pinholes 126 may receive fasteners secured to the body 112 of the detector assembly. The mounting base 124 may also have a cold plate 128 at the bottom of the mounting base 124. The cold plate 128 may be adapted to have coolant tubing 130 providing a connection to the interior of the base 112. As with the detector assembly, a hermetic seal may be applied upon the housing containing the detector assembly.

FIG. 7A illustrates a detailed sectional view of an edge 134 of the housing, specifically, the edge 134 of the mounting base 124. A hermetic seal 136 may be used to seal the housing in this particular embodiment. The coolant tubing 130, and any other area that does not require a coating, may be masked to prevent sealing of the tubing. Similarly, the conductors may be masked so that the coating does not seal off the conductive lines or detrimentally affect the conductive capabilities of the conductors in any manner. It should be noted that any suitable seal may be utilized in the particular embodiment.

Figure 8:
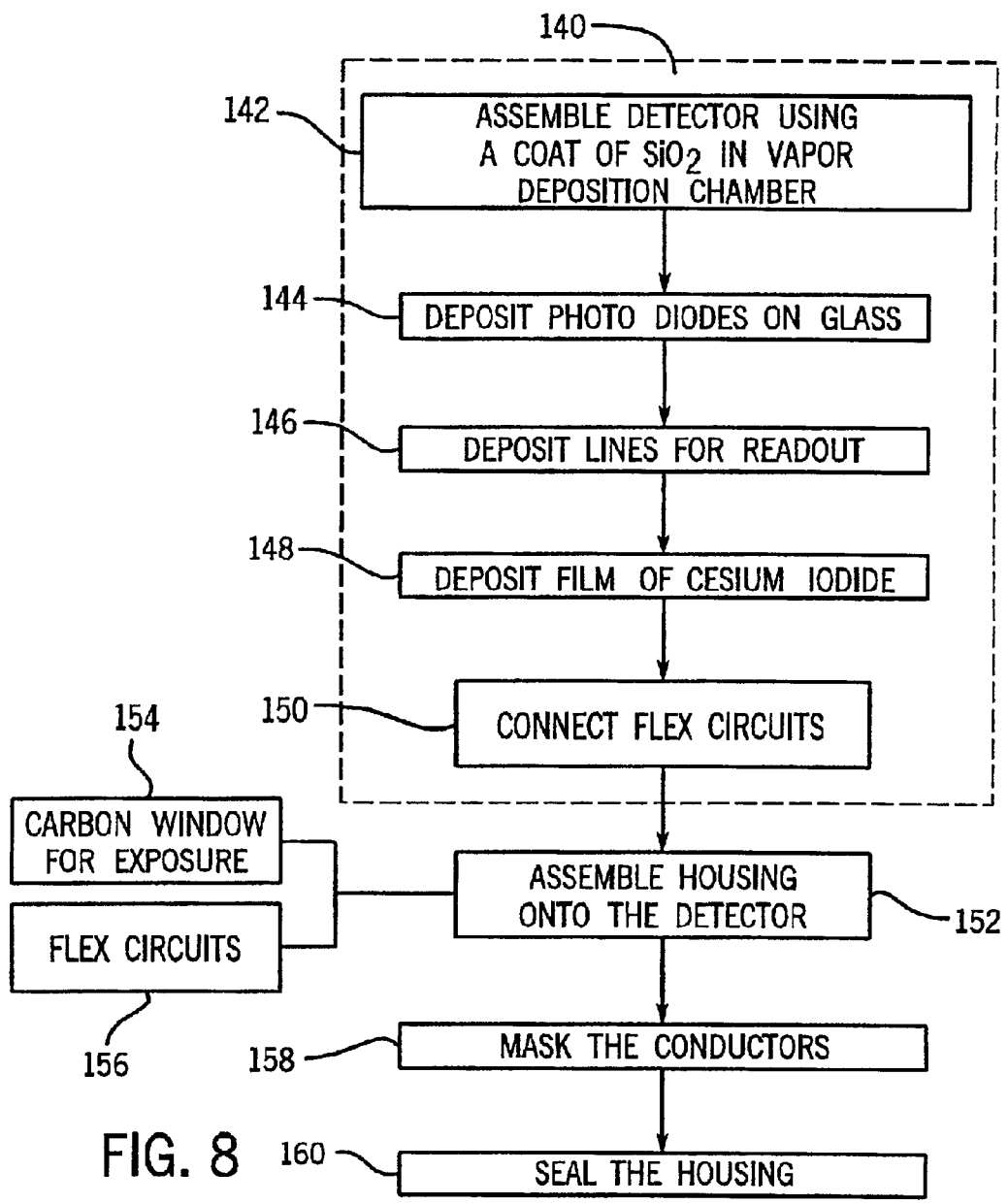
FIG. 8 is a flowchart representing a method for assembling an exemplary detector and housing.

FIG. 8 is a flowchart depicting a process for assembling a detector and housing. A first phase 140 includes steps for assembling the detector. The detector is assembled in part by depositing a coat of SiO2 upon the glass substrate in a vapor deposition chamber as shown in step 142. Once the glass substrate is coated with the SiO2, photodiodes are deposited on the glass substrate as indicated in step 144. Further, in step 146 conductive lines are deposited upon the glass substrate for readout of the detector. Advancing to step 148, after the conductive lines are deposited, a film of cesium iodide is deposited. Flex circuits are then connected to the photodiodes within the array 78 as indicated by step 150. It should be noted that other steps may be taken in assembling a detector. However, as the present technique relates to the sealing of the detector, only a general overview of the method used in creating a detector is described. A hermetic seal may be used to seal the detector before the housing is assembled with the detector. In one particular embodiment, such sealing improves upon the efficiency of the detector. However, in the present technique, the detector housing is also sealed following assembly.

Typically, the housing is assembled on to the detector as shown in step 152. Step 154 and step 156 in the assembly process of the housing usually provide a carbon window for the x-ray exposure and the connection of flex circuits to facilitate data acquisition and image processing. Subsequently, parylene or other suitable sealing coating may be applied to the detector window rather than coating the panel directly. This technique allows the panel and housing to be sealed, and to be more easily repaired if required. Conductors and other components that require external connections may be masked as indicated by step 158. Finally, step 160 indicates the completion of the assembly process. At step 160, once the conductors are masked and the housing is assembled onto the detector, the housing may be hermetically sealed. As mentioned above, parylene is one exemplary type of coating which may be utilized. However, it should be noted that any type of sealing material may be used to seal the housing within which tile detector panel is assembled.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for assembling an imaging system comprising the acts of:

assembling a detector, the detector being adapted to fit within a housing, and the detector having an array of pixels forming rows and columns, each pixel having radiation detection circuitry for providing a signal from radiation received;

sealing the detector after assembling the detector;

assembling the detector within a housing, the housing being adapted to provide a unified structure, the housing comprising a mounting base and an outer cover; and sealing the housing on all sides thereof.

2. The method as in claim 1, wherein the act of assembling the detector comprises the acts of:

coating a glass substrate with silicon oxide in a vapor deposition chamber;

depositing photodiodes on a glass substrate;

depositing conductive readout lines, the readout lines capable of reading out data; and depositing a film of cesium iodide on the glass substrate.

3. The method as in claim 1, wherein the act of sealing the detector comprises coating the detector with parylene.

4. The method as in claim 1, wherein the act of sealing the housing comprises the act of coating the housing with parylene.

5. The method as in claim 2, wherein the readout lines are masked during the act of sealing the detector.

6. A sealed detector for an imaging system comprising:

a detector including an array of pixels forming rows and columns, each pixel having radiation detection circuitry for providing a signal from radiation received by the detector;

a housing assembly, the assembly being configured to receive the detector and having a body with a recess and a plurality of elements fitted within the recess; and a protective layer surrounding exterior portions of the housing assembly to seal all sides thereof.

7. The detector as in claim 6, wherein the protective layer is a parylene coating.

8. The detector as in claim 6, wherein the detector includes a detector assembly comprising:

a glass substrate having a silicon oxide coating;

a plurality of photodiodes deposited on the glass substrate;

conductive readout lines configured to reading out data from the plurality of photodiodes; and a film of cesium iodide on the glass substrate.

9. The detector as in claim 6, wherein a coating surrounding exterior portions of the detector is applied.

10. The detector as in claim 6, wherein the detector includes readout conductors extending from the housing assembly.

11. The detector as in claim 6, wherein the housing assembly includes a body adapted to receive the detector assembly and a cover.

12. A digital imaging system, comprising:

a source of radiation;

a control circuit to regulate the source of radiation; and a detector for receiving radiation from the source of radiation and generating signals therefrom, the detector having an array of pixels forming rows and columns, and a protective layer, the protective layer being coated on the surface of the detector to seal all sides thereof.

13. The system as in claim 12, wherein the protective layer on the detector includes a parylene coating.

14. The system as in claim 12, wherein the detector is adapted into a housing.

15. The system as in claim 14, wherein the housing comprises:

a mounting base, having peripheral walls; and a cold plate adapted to cover the mounting base, and configured to fasten to the mounting base creating a recess, and the detector being adaptable into the recess.

16. The system as in claim 15, wherein the housing is coated with a protective layer of parylene.

17. An sealed imaging system detector comprising:

means for detecting radiation including an array of pixels forming rows and columns;

means for housing the means for detecting; and means for sealing the means for housing on all sides thereof.

18. The imaging system detector as in claim 17, wherein the means for housing comprises means for receiving a panel assembly into a housing.

19. The imaging system detector as in claim 17, wherein the means for housing includes means for fastening the means for detecting to the means for housing.

20. The imaging system detector as in claim 17, wherein means for housing includes a plurality of elements for adapting a housing to a detector.

21. The imaging system detector as in claim 17, wherein the means for sealing comprises means for coating the means for detecting.

22. The imaging system detector as in claim 17, wherein the means for sealing comprises a parylene layer disposed over the means for housing.

* * * * *